United States Patent
Deter et al.

(10) Patent No.: US 6,169,621 B1
(45) Date of Patent: Jan. 2, 2001

(54) DEVICE FOR THE PRODUCTION OF AN IMAGE ON A SCREEN BY ILLUMINATING PICTURE ELEMENTS IN A PLURALITY OF PARTIAL IMAGES

(75) Inventors: Christhard Deter; Klaus Hiller, both of Gera; Rolf Roeder, Jena-Lobeda, all of (DE)

(73) Assignees: Carl Zeiss Jena GmbH, Jena; LDT GmbH & Co. Laser-Display-Technology KG, Gera, both of (DE)

(*) Notice: Under 35 U.S.C. 154(b), the term of this patent shall be extended for 0 days.

(21) Appl. No.: 09/091,153
(22) PCT Filed: Oct. 8, 1987
(86) PCT No.: PCT/EP97/05541
§ 371 Date: Jun. 8, 1998
§ 102(e) Date: Jun. 8, 1998
(87) PCT Pub. No.: WO98/15938
PCT Pub. Date: Apr. 16, 1998

(30) Foreign Application Priority Data

Oct. 9, 1996 (DE) .............................................. 196 41 657

(51) Int. Cl.⁷ .................................................... G02B 26/08
(52) U.S. Cl. ........................... 359/201; 359/202; 359/204
(58) Field of Search .................................... 359/201, 202, 359/204; 347/232, 233, 236, 243; 348/98–100, 108–109, 201, 203; 358/474, 493

(56) References Cited

U.S. PATENT DOCUMENTS 4,297,723 10/1981 Whithy .

5,835,252 * 11/1998 Meier et al. .......................... 359/201

FOREIGN PATENT DOCUMENTS 0 396 128 11/1990 (EP) .
WO 95/01061 1/1995 (WO) .

OTHER PUBLICATIONS

XP 004043543/"Farbfernseh–Grossprojektion mit laser" (p. 96) 1970 (No Month).

XP–002057345/"Die Planetariumsmaschine im Amphitheater—die Erfassung der geneigten Kuppel" (pp. 65–75) 1992 (No Month).

* cited by examiner

Primary Examiner—James Phan
(74) Attorney, Agent, or Firm—Reed Smith LLP (57) ABSTRACT

In an apparatus for generating an image on a screen by illuminating image points in a plurality of partial images by light bundles, wherein the apparatus has at least one deflection device for deflecting a plurality of light bundles in respectively associated image points of the individual partial images, and a control device for controlling the intensity of the light bundles depending on the brightness of the respective image point to be illuminated, and optics between the screen and deflection device for deflecting the light bundles in a partial image associated with the respective light bundle, it is provided that the optics include an entrance pupil which is spread out over an extended area and an exit pupil which is much smaller in comparison to the entrance pupil, and in that a plurality of deflection devices for deflecting a light bundle associated with a partial image are provided in or near the entrance pupil which is spread out over an extended area.

18 Claims, 6 Drawing Sheets

DEVICE FOR THE PRODUCTION OF AN IMAGE ON A SCREEN BY ILLUMINATING PICTURE ELEMENTS IN A PLURALITY OF PARTIAL IMAGES

BACKGROUND OF THE INVENTION a) Field of the Invention

The invention is directed to an apparatus for generating an image on a screen by illuminating image points in a plurality of partial images by means of light bundles, wherein the apparatus has at least one deflection device for deflecting a plurality of light bundles in respectively associated image points of the individual partial images, and a control device for controlling the intensity of the light bundles depending on the brightness of the respective image point to be illuminated, and optics between the screen and deflection device for transforming the light bundles in a partial image associated with the respective light bundle.

b) Description of the Related Art

Projection devices of the type mentioned above are dimensioned, on the one hand, for flat large-area projection screens, for example, in stadiums or cinemas, and, on the other hand, for cylindrical-wall or spherical-wall, dome-shaped screens, for example, for simulators or planetaria.

Large-area image displays which give the observer the impression of being surrounded by space are required especially for planetaria, but also for flight simulators. As evidenced by the success of the presentations in the planetarium in the Forum der Technik in Munich, dome projections of films and laser shows appeal to a large segment of the population, so that it is expected that an entirely new area of entertainment can be opened up given suitable economical technical solutions.

At present, a substantial difficulty with regard to the projection of the images mentioned above consists in the generation of a sufficiently high luminous density because, assuming a spectator space of the same size, a surface to be covered by a projection is substantially greater than a conventional cinema screen, for example. Therefore, a remedy for projecting an image has been sought in the independent projection of partial images in individual contiguous screen segments from which a total image is formed. However, the films which must be used in this case have a very large format due to the high illumination density and the consequent thermal loading. Furthermore, they are also difficult to handle for this reason. In spite of the large film sizes, projectors in current use always require elaborate cooling measures.

For this reason, this type of projection has not been introduced before in cinema technology for showing a two-hour film, for example, apart from isolated instances such as projection devices at public festivals offering only short films at a commensurate price.

Further, projection in a plurality of partial images creates problems for reasons of geometry particularly with respect to the division of a spherical projection surface into a plurality of image segments.

Planar imaging on a curved surface without distortion is impossible. Further, there are always overlapping areas when projecting partial images, for example, when the projected image is delimited by straight edge areas. This problem can be solved by distorting the image to be projected on the film itself, for example, in order to compensate for the geometric distortions, and by cutting off in the overlapping area. Specially processed films for dome projection are required in this case. This is also a big cost factor which has so far restricted commercial utilization.

WO 95/01061 describes a projection system in which a light beam is deflected by means of X-Y scanners and projected in a dome as vector graphics by means of a projection system comprising lens arrays. In this arrangement, the deflecting mirrors are arranged one behind the other in the beam path and are controlled in Cartesian coordinates.

In the book, "Der Himmel auf Erden, die Welt der Planetarien", Ludwig Meier, Verlag Johann Ambrosius Barth, Leipzig-Heidelberg, 1992, pages 65 to 67, a dome projection is described, wherein the dome is filled with content by projecting an individual film. A fisheye lens is used to illuminate the partially spherical screen. However, this type of projection results in insurmountable distortions at the edge of the image. Further, because of the high thermal loading of the film by 12,000-Watt arc lamps, a cooling of the 70 mm film, already a large format, must be provided.

Moreover, the special production of a film with a running time of 30 minutes would cost in the region of several million U.S. dollars.

For a more economical management of distortions in the primary projected image, there are suggestions for image processing by means of computer which are described in detail on pages 70 ff. of the above-mentioned book. Pages 71–75, for example, describe a planetarium in which stars are shown on a picture tube in an electronically controlled manner. The image contents generated on the screen of the picture tube are subsequently projected again in the dome with a fisheye lens system.

Cinema films could also be projected on a dome in the same manner with a system of this kind. However, current computer performance for distortion of the image so that these images can be projected on the dome via the fisheye lens system so as to be restored to their geometrically correct state are inadequate.

It is further suggested on pages 70 and 71 of the above-mentioned book to display images with lasers by means of raster scanning on the curved screen as in the example of electron beam tubes. However, experiments in this direction have not led to commercial success owing to the low available laser output, the required high writing speed to the screen, and the resulting poor resolution taking into account conventional switching speeds for controlling intensity.

For smaller partially spherical surfaces, on the other hand, a laser device of the type mentioned above is known from U.S. Pat. No. 4,297,723, in which an image is displayed on a partially spherical screen surface in three separate sectors by raster scanning. To display the image in the image segments illuminated by three partial images, three light bundles are combined by means of a mirror system, directed by optics onto a raster scanning device jointly shared by all of the partial images, and then separated again by means of further optics and subsequently deflected onto the screen in the individual image segments by additional expansion optics.

However, the combination of the laser beams on practically one point of the deflection device and subsequent separation requires highly precise adjustment. This disadvantage is particularly critical when it is considered that the illumination of a large, hemispherical screen, for example, requires substantially more than three image segments to be illuminated, so that the effort for adjustment of the mirror systems and optics which would be required for this purpose would no longer be realizable in practice.

OBJECT AND SUMMARY OF THE INVENTION

Therefore, it is the primary object of the invention to provide an apparatus for the illumination of a plurality of partial images of an image which substantially avoids the disadvantages mentioned above. In particular, adjustment expenditure in this apparatus is greatly reduced.

Based on the prior art mentioned above, this object is met in that the optics include an entrance pupil which is spread out over an extended area and an exit pupil which is much smaller in comparison to the entrance pupil, and in that a plurality of deflection devices for deflecting a light bundle associated with a partial image are provided in or near the entrance pupil which is spread out over an extended area or are formed therein.

Therefore, the optics used in accordance with the invention differ from the optics known from U.S. Pat. No. 4,297,723, for example, in that the large area of an entrance pupil is imaged in a very small, practically punctiform exit pupil and a plurality of deflection devices are arranged in or in the vicinity of the entrance pupil of these optics or are formed therein. Because of this characteristic of the optics, a raster region generated in the entrance pupil is then always transformed into a partial image on the projection surface, for example, a planar wall or a dome, wherein the projecting light bundle emerges from a practically punctiform exit pupil. An angular change in a light bundle entering into the entrance pupil likewise results in an angular change in the exiting light bundle, so that a raster scanning with respect to the deflection angle of the light bundle entering the entrance pupil expresses itself in a raster scanning of the deflection angle of the beam emerging from the optics such that this beam proceeds from the small-area exit pupil so as to be almost independent from the position of the deflection device within the entrance pupil.

In order to illustrate this behavior more clearly, the optics will be explained using the example of an afocal lens system. Lens systems of this kind are formed substantially from two focussing lens systems in which the image-side focal point of the first lens system substantially coincides with an object-side focal point of the second lens system. As is known, a parallel beam bundle is reduced through a lens system of this kind by the ratio of the focal length of the first lens system to that of the second lens system, wherein, however, the tangent of the angle of an emergent light bundle with respect to the tangent of the angle of an incoming light bundle is increased by the same ratio.

When projecting on a screen from a distance of several meters, a good resolution can generally be achieved when the surface area of the exit pupil from which the light bundle generated by the optics proceeds lies within the millimeter range, especially several millimeters. If the above-mentioned focal length ratio is selected very high, the light bundle entering the optics can be displaced, for example, by up to a few centimeters without a noticeable wandering of the light bundle emerging from the exit pupil which has a diameter of several millimeters.

In the case of a focal length ratio of this kind, the deflection angle of the projected beam is enlarged by the factor given by the focal length ratio, so that the deflection during raster scanning need only be very small in order to sweep over a large dome surface.

This characteristic applies to the entrance pupil in its entirety which, because of these optics, is large enough so that a plurality of deflection devices can be arranged next to one another, wherein every deflection device scans a portion of the projection surface in that different light bundles are deflected in different solid angle areas by these respective deflection devices. The different solid angle areas which are variously scanned by the raster scanning are assigned by means of the optics to image segments on, for example, a dome serving as a screen, these image segments being illuminated by the partial images.

If the above-mentioned focal length ratio serving as an illustration is selected so as to be extremely high, for example, 100, and diffraction limitation is not taken into account, the effect of the optics is especially clear. If this can be realized, a plurality of deflection devices could be arranged in an entrance pupil having a few more decimeters in size. In practice, optics with smaller focal length ratios are used, especially because the distance between the different deflection devices which become noticeable in small local deviations within the exit pupil, can also be minimized by allocation of the solid angle area during deflection.

The required focal length ratio in the optics which are mentioned by way of example is determined essentially by the size of the dome and the resolution to be achieved. For practical applications, a focal length ratio of greater than 5 to 10, for example, should be considered given similar dimensions for the optics mentioned by way of example.

Further consideration shows that the above-mentioned lens system is not operative for displaying images in a hemisphere or half-sphere when the tangent of the angle of incidence is changed proportionally into a tangent of the exit angle. At an exit angle of 90°, as is required, for example, for raster scanning a half-sphere, the tangent diverges. This means that the exit angle of a lens system of this type should be maintained below 90°. In order to sweep over the entire dome, the expansion optics should be designed for a functional relationship between the incident angle and the exit angle which is limited with respect to total angular range.

Expansion optics of this kind can be dimensioned in such a way, for example, that the functional dependence of the tangent of the angle is transformed into a virtually exclusive angular dependency. A person skilled in the art is familiar with the construction of expansion optics of this kind.

The above considerations also illustrate another substantial advantage over the prior art. In the known process for illumination of a half-sphere, the equatorial plane always entails a loss of resolution because of the distortions mentioned above. However, in the optical system indicated by way of example, leaving aside diffraction limitations, the laser beam emerging from the optics is reduced in diameter relative to the diameter of the incoming beam by the focal length ratio. Because of the reduction in the diameter of light bundles effected in afocal systems of the above-mentioned type, a laser beam of 1 mm entering the entrance pupil could be sufficient, in accordance with expectations, to ensure a suitable resolution also on the equator of a hemispherical surface, so that in a planetarium, for example, very dim stars on the equatorial sky can also be imaged in a realistic manner.

A further problem hindering dome projection in the prior art is solved by the invention in a likewise simple fashion. In uniform raster scanning of sectors according to known methods, the deflection is always carried out most quickly in the equatorial plane because the largest distance must be illuminated at this location with the highest resolution within the same time period. This means that the times brought about by electronic switching speeds likewise result in a loss of resolution in this case, and punctiform stars are imaged as lines.

By means of the invention, a plurality of deflection devices can now be overlapped for partial images to be displayed in the vicinity of the equator. With a corresponding quantity of deflection devices, each of which only generates a point only for a reduced quantity of stars, any time period of sufficient length for the illumination of individual image points is made available. Extremely fast electronics with problematic high-frequency behavior with respect to radio interference or crosstalk can then be substantially dispensed with without impairing resolution.

Due to the optical characteristics of the lens system, the partial areas transformed by the optics in the above-mentioned example of an afocal lens system are arranged close together in the exit pupil.

However, the imaging principle described above is not limited to domes. In order to increase the luminous density and to achieve a particularly high resolution at deflection speeds which are easily realized, a similar lens system can also be advantageously used for flat screens or other projection surfaces of optional shape also taking into account the features according to the invention at the same time.

While the arrangement of deflection devices in the entrance pupil according to the invention can also be carried out very simply in terms of construction, it can also be advisable to arrange the deflection devices at some distance from the entrance pupil where there may possibly be more space for the arrangement of a plurality of deflection devices. An imaging of the deflection areas is then carried out, according to the invention, from the location of the deflection devices in the entrance pupil by means of additional optics, for example, by using pupil displacement means. The pupil displacement means are advisably an afocal optical system which transforms the optical ratios at the location of the entrance pupil into the location of the exit pupil.

With respect to display on a planar screen and when the image can be raster scanned line-by-line, a preferred further development provides that each of the partial images contain a plurality of lines.

In another advantageous further development, a deflection device which is arranged centrally in the entrance pupil generates a partial image whose center lies on the optical axis of the optics. Accordingly, the symmetry of the optics is utilized for a high-quality image display. Further, the geometric problem of a singularity at the pole can be overcome in this way in the case of dome projection because, in accordance with this further development of the invention, the intensity at the pole is well defined mathematically in the direction of the optical axis in an unequivocal manner for an incoming beam on this optical axis.

As has already been stated, the invention can be used in general for displaying images on optionally curved screens. In particular, the invention is useful for flat screens in sports arenas or background projections in film production when a plurality of partial images must be raster scanned because the screen is too large to be illuminated, for example, by an individual low-output laser source.

In accordance with a preferred further development of the invention, however, the screen is spherically curved and the deflection devices are designed in connection with the optics for the illumination of partial spherical surfaces of the screen. A planetarium can be realized in a simple manner in this way, for example.

Particularly simple geometric relationships are also given for this spherically curved screen which substantially facilitate the imaging on a dome by means of partial images which do not overlap when, in accordance with a further preferred development of the invention, a spherical center point is assigned to the spherically curved screen and the exit pupil of the optics is arranged in such a way that the spherical center point lies therein. In this case, the light bundles emerging from the optics propagate to the screen on the same radii. For example, the same luminosity and resolution can accordingly be ensured in a simple manner in all of the image segments illuminated by the partial images independent from the raster-scanned solid angle area.

In another preferred further development of the invention, a control device is provided which deflects a plurality of light bundles into the entrance pupil of the optics in a circular manner by means of deflection devices associated with these light bundles. This control device for driving the deflection devices is designed in such a way that the outer radius of a circular ring illuminated by a deflection device is equal to the inner radius of a circular ring that is illuminated by another deflection device.

Due to this further development, the surface of the screen can be covered in a particularly simple manner with an economy of controlling means for the deflection devices. In the optics with afocal lens system mentioned above by way of example, the image segments are individual geometric spherical zones which cover the spherical surface due to the indicated relationships between the radii without overlapping areas. When dividing into image segments in other ways known from the prior art, an overlapping of these image segments during raster scanning of the primary light bundles proved disadvantageous and required a special control of the deflection devices or a blanking of image points. Controls of this kind which can be uneconomical are dispensed with in this further development of the invention.

In particular, a half-sphere is illuminated in a simple manner in this kind of raster scanning according to an advantageous further development of the invention when the control device for the outer radius of the largest circular ring in the case of a circular deflection of the light bundle entering the optics is so designed that the light bundle exiting the optics lies on this radius within an equatorial plane of a sphere.

In another preferred further development of the invention, the image segments on the screen that are swept by the light bundle associated with a respective deflection device and that are illuminated by partial images have equal surfaces.

By means of this further development of the invention, the same light intensity can be provided in all of the light bundles for the respective individual image segments. On the one hand, this results in a standardization for individual light sources generating the light bundles and, on the other hand, enables an optimum utilization of energy of the light sources, so that construction costs and operating costs can be advantageously reduced because any cooling required can be used with minimum power.

However, it is also useful for improving the resolution to compensate for changes in intensity in the light bundles by means of an intensity control and, in accordance with an advantageous further development of the invention, to provide that the image displayed by the deflection devices is resolved into lines and image points and that each of the image segments illuminated by partial images has the same number of lines.

In another preferable further development of the invention, at least one deflection device contains a mirror.

Acoustooptical elements which enable very fast deflections can be used to deflect light bundles. However, according to the invention, fast defections are not absolutely required. Therefore, it is possible to make use of the advantages of mirrors:

Mirrors are preferred above all because of the absence of chromatic aberrations, so that color images can be displayed without interfering color edges. In particular, this absence of chromatic errors also has positive results in a planetarium in which essentially white stars are projected on a black background, since a mixture of light of different wavelengths is advisably used in the light bundle to display white stars.

The following further developments of the invention by means of deflection devices containing mirrors are designed above all for a simplified arrangement.

In the first of these further developments of the invention, the mirror is arranged with a mirror surface which is rotatable about an inclined axis at an angle not equal to zero relative to its surface normal. As a result of this construction and arrangement, the light bundle reflected at this mirror surface and deflected in the optics generally describes in the entrance pupil an ellipse in an imaginary plane between the mirror and optics, which ellipse can be transformed into a circle by means of a specially curved mirror surface and/or subsequent optics. The above-mentioned imaging of circular rings in the entrance pupil of the optics can be realized in a simple manner in this way.

In particular, the entire circular ring can be raster scanned with a tilting movement impressed on the axis in addition to the rotating movement.

However, according to a preferred further development of the invention, it is advisable with respect to movement control when a mirror which is swivelable in two directions is provided in addition in the deflection device. By suitable control, the rotatable mirror generates individual circles of the light bundle whose radius changes over time with the swiveling mirror because of the swiveling movement and different exit angles of the light bundle. Due to the fact, mentioned above, that the optics are configured so as not to be critical with respect to position, a possible wandering of the circular ring due to the tilting movement has only a negligible effect, if any, on the light bundle exiting from the exit pupil.

In another preferable further development of the invention, it is only necessary to use one mirror for all directions when a mirror which is swivelable in two directions is provided in the deflection device.

Therefore, the circular rings which were seen above as advantageous can likewise be realized in a simple manner in the following further development of the invention in which the mirror which is swivelable in two directions has two axes orthogonal to one another for swiveling and in which a control device for these axes is provided in the apparatus, wherein a periodic sinusoidally varying angular change can be applied to both axes by means of this control device, and wherein the impressed angular change of one axis is shifted in phase by 90° relative to the other axis.

In particular, in accordance with a preferred further development of the invention, very good sinusoidal control is made possible with only a small harmonic component which could result from the natural frequencies of the mirror when the oscillating behavior of the mirror about each of the axes has a frequency spectrum with a center frequency and a defined bandwidth and the frequency of the periodically sinusoidally changing angular change generated by the control device is equal to the center frequency or lies in its vicinity within the bandwidth. In this case, the sinusoidal excitation due to the control device is practically equal to the resonant frequency of the mirror oscillation so that a possible component of beat frequencies and higher harmonics can be kept small. Further, only the lowest possible energy consumption is required for controlling the oscillation. Further, stresses in the mirror during the excitation of angular changes are prevented, so that wear on the mirror and mechanical elements for mirror movement is reduced.

At high deflection frequencies, however, the mirror mass and mirror surface should be kept very small. This means that mirrors of this type are most advantageously produced by micromechanical techniques, which further allows a very compact construction, so that even as many as several hundred deflection devices could be integrated on a silicon substrate in a simple manner. In this case, depending on requirements with respect to construction, it would even be possible to integrate the control device on the same chip. Similar mirror arrangements with mirrors which are tiltable in one direction have already been produced by Texas Instruments, although for different applications.

In another advantageous further development of the invention, light generation devices for light with at least three different wavelengths are provided for generating the light bundles. Due to these further developments, color images can also be displayed. This is also advantageous for planetaria because the planets in their true-to-nature state distinctly show colors other than white. When displaying stars, for example, by means of lasers, the use of light of a plurality of wavelengths is also advantageous, so that the color of the imaged stars appears white.

As was already mentioned above, the exit pupil should have very small dimensions. This means that even minor optical interference such as dust and scratches on lenses can cause a considerable deterioration of imaging characteristics. It is therefore advisable to exercise strict quality control with respect to the lenses and mirrors forming the optics.

In another preferred further development, the foci of the optics lie in a spatial area outside of the optical elements forming the optics. In this way, the influence of the above-mentioned interference can be extensively prevented or reduced.

In the following, the invention is explained more fully by way of example with reference to the drawing.

DESCRIPTION OF THE PREFERRED EMBODIMENTS

Figure 1:
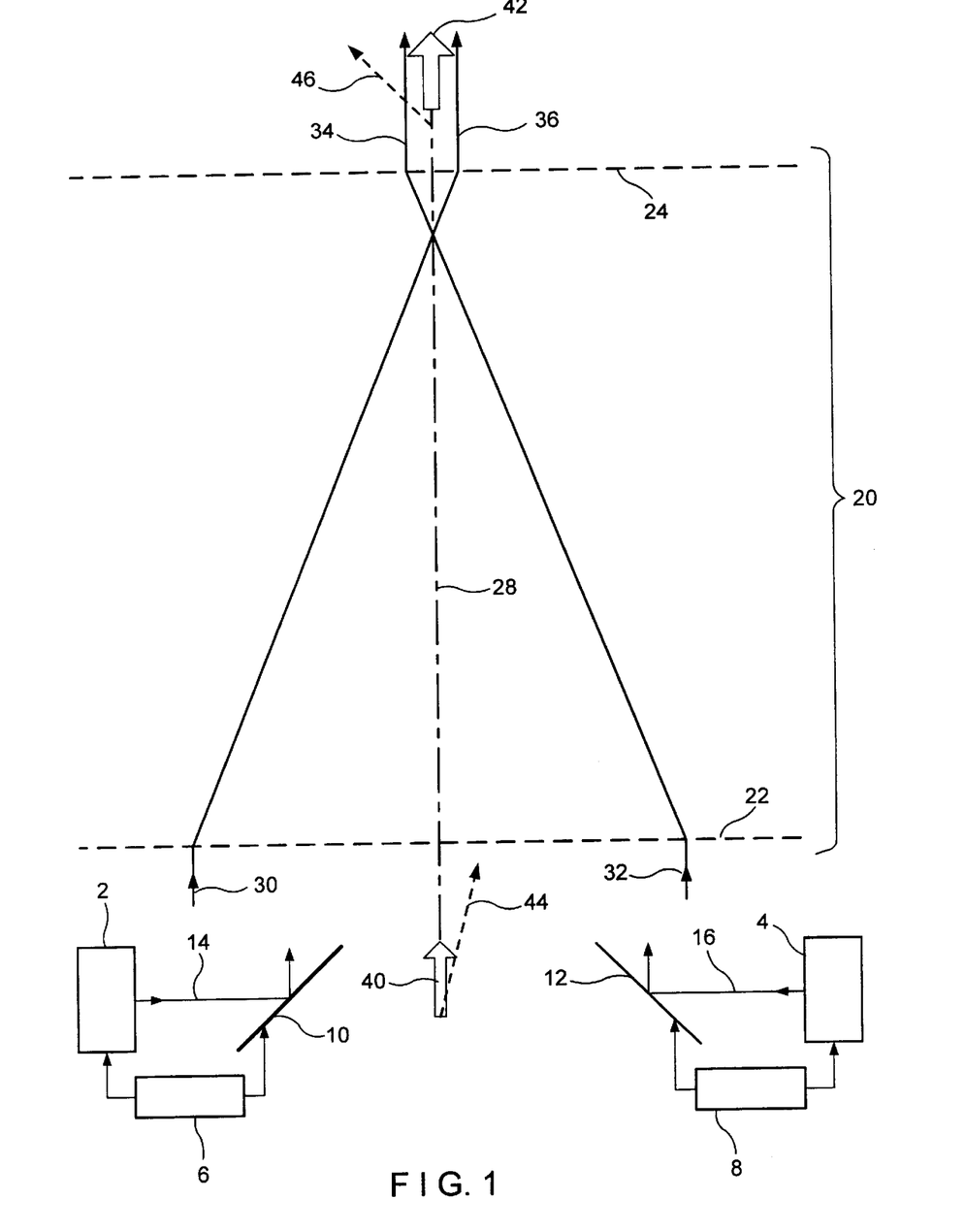
FIG. 1 shows a construction of an optical system, wherein two deflection devices are arranged in the entrance pupil of the optics.

FIG. 1 is a schematic view showing two light sources 2 ana 4 which, due to the high degree of parallelism of the light bundles, are preferably lasers. These lasers illuminate image points on a screen 5 indicated in FIG. 2. The image points are illuminated by means of modulation of the light bundles by the respective control devices 6 and 8 with respect to the image content to be displayed, i.e., color and brightness of image points.

Further, two deflection devices 10 and 12 are arranged in the entrance pupil at the control devices 6 and 8 for deflecting two light bundles 14 and 16 into subsequent optics 20. The control devices 6 and 8 generate the image to be displayed on the screen; in the embodiment example, this is carried out by raster scanning as in television, wherein, however, instead of the electron beam conventional in television, light bundles 14, 16 are controlled with respect to intensity and are deflected by means of deflection devices 10 and 12 onto the respective image point to be illuminated. While the following embodiment examples refer to a uniform raster scanning of the image points, the invention can also be used for other types of deflections, for example, by illuminating exclusively points and lines to be displayed such as is known from vector graphics.

In the embodiment example, the deflection devices 10 and 12 are shown at a much greater distance from the optics 20 than in FIG. 1. This is illustrated in FIG. 1 by a break in the lines representing the light bundles 14 and 16 deflected by the deflection devices 10 and 12.

The optics 20 which are shown schematically have two lens systems 22 and 24 which are shown schematically by a dashed line. In a construction conforming to practice, these lines are replaced in a known manner by the conventional two principal planes of lens systems. However, for purposes of explaining the optics 20, the schematic construction shown in FIG. 1 is sufficient to enable a person knowledgeable in the field of optics to dimension the optics 20 used in the invention.

The following considerations also only relate to the imaging characteristics. A correction for distortions and chromatic errors can be carried out in a conventional manner by selecting the lens characteristics in the individual lens systems 22 and 24, wherein a total correction of the optics is preferred over a correction of each individual lens system 22, 24 in order to simplify the construction of the optics 20.

The lens systems 22 and 24 of the optics 20 are conceived as individual lenses at the position of the broken lines in the schematic illustration shown in FIG. 1. In the embodiment example, the image-side focal point of the lens system 22 coincides with the object-side focal point of the lens system 24. In this way, an afocal lens system is formed which changes an incoming light bundle 30 or 32 entering parallel to the optical axis 28 into an exiting light bundle 34 or 36 exiting parallel to the optical axis.

The imaging characteristics of an afocal lens system are substantially given by the focal length ratio of the two lens systems 22 and 24 which has the value of 11 in the schematic drawing of FIG. 1. As will be clear from the following description, a higher focal length ratio is desirable, but this can be graphically illustrated only in an extremely unsatisfactory manner for explaining the principle.

In the optical system shown in FIG. 1, the focal length of the lens system 24 is less than that of the optical system 22. Due to the focal length ratio, the two light bundles 34 and 36 which exit in parallel from the lens system 24 move closer together by the reciprocal of the focal length ratio than the light bundles 30 and 32 exiting the deflection devices 10 and 12 and entering the optics 20. Therefore, by suitably selecting the focal length ratio and the spacing of the deflection devices 10 and 12, all light bundles 3 and 32 are combined in practice into a single emergent light bundle. The resulting positional independence of the deflection devices 10 and 12 considerably reduces the adjustment effort.

The angular dependency between a light bundle entering the optics and the emergent light bundle is likewise shown schematically in FIG. 1. The incoming light bundle to be considered is shown by a bold arrow 40. This light bundle enters parallel to the optical axis 28 so that it exits the optics 20 in the direction of the bold arrow 42 from the lens system 20 due to the characteristics of afocal lens systems.

On the other hand, when the incoming light bundle enters at a small angle to the optical axis 28 as is indicated by the dashed arrow 44, the light bundle is deflected at a greater angle as is shown by arrow 46.

The common location on the optical axis 28 from which the light bundles proceed from the lens system at different angles of the incoming light bundle depends on the object-side location for the deflection of the light bundle. Therefore, for purposes of uniform illumination, for example, of a spherical surface serving as screen 5, all of the deflection devices 10 and 14 are advisably arranged in a common plane vertical to the optical axis 28. Particularly advantageous optical characteristics result when the common location of the deflection lies in the vicinity of the image-side focal point of the lens system 24, i.e., when the plane in which the deflection devices 10 and 12 are arranged lies in the vicinity of the object-side focal plane of the lens system 22.

The embodiment example in FIG. 1 can be used in an especially favorable manner for projection on a flat screen. In this way, as is often usual in afocal systems, a functional relationship between the incident angle and exit angle can be provided according to the tangent condition. A relationship of this kind is not possible for a dome projection with exit angles in the range of 90°, since the tangent diverges in the neighborhood of 90°.

As is shown in more detail in a subsequent embodiment example, it is recommended in the case of dome projection to select a functional relationship in which the exit angle is proportional to the incidence angle. This is indicated schematically in FIG. 1 in which a light bundle scanned in the direction of arrow 44 exits from the optics 20 in the direction of arrow 46. A light bundle entering parallel to the optical axis in the direction arrow 40, on the other hand, is transferred without deflection to the output of the optics 20 as is indicated by arrow 42.

Given a suitable design of the optics 20 and a suitable arrangement of the deflection devices 10 and 12, the chromatic correction of the optics 20 plays only an unimportant role. As was already mentioned above, the common location from which various deflected light bundles emanate depends on the distance of the deflection devices 10 and 12 from the entrance pupil of the optics 20. If a light bundle composed of laser light of different wavelengths is not raster scanned as a total bundle, but rather separately by an independent deflection device for each wavelength, a wavelength-independent identical location can be adjusted for the light bundle exiting from the optics 20 by selecting the distance of the respective deflection devices 10 or 12. If the focal length ratio is also dependent on the wavelength, this can be compensated by selecting different deflection angles during raster scanning.

Optical distortions of the lens system can also be compensated by distorting the displayed information during raster scanning, for example, in that the image to be projected is read into an image storage, but is read out for the display as a distorted image corrected for the distortions. In this case, in order to achieve a uniform line density during raster scanning, the information read out of the image storage is advisably interpolated with known algorithms for the respective location to be imaged.

These compensation possibilities for correcting imaging errors of the optics 20 make it possible to substantially facilitate the construction of the optics 20, since these imaging errors can be compensated for distortions as well as for chromatic errors through the control and the positioning of the deflection devices at least partially electronically or by information processing techniques. A change in the diameter of the light bundle possibly exiting from the optics 20, which light bundle could generate image points of various sizes on the screen depending on the illuminated location, can be left out of consideration in this case, since the diameter of the incoming light bundle is reduced by the focal length ratio of the lens systems 22 and 24, that is, for example, in the case of laser beams with a diameter smaller than 1 mm behind the optics 20, disregarding the effect of diffraction, the diameter is less than 1/10 mm.

A very simplified optical system 20 which can be a hologram, for example, is also possible. Usually, no holographic systems can be used due to the color-dependent imaging characteristic in color picture systems. However, holograms can be used in this case because of the features according to the invention, since chromatic aberrations can be compensated for by suitable arrangement of deflection devices for light bundles of different wavelengths, as was explained.

The essential characteristics of the optics will now be illustrated with reference to FIGS. 2 and 3.

Figure 2:
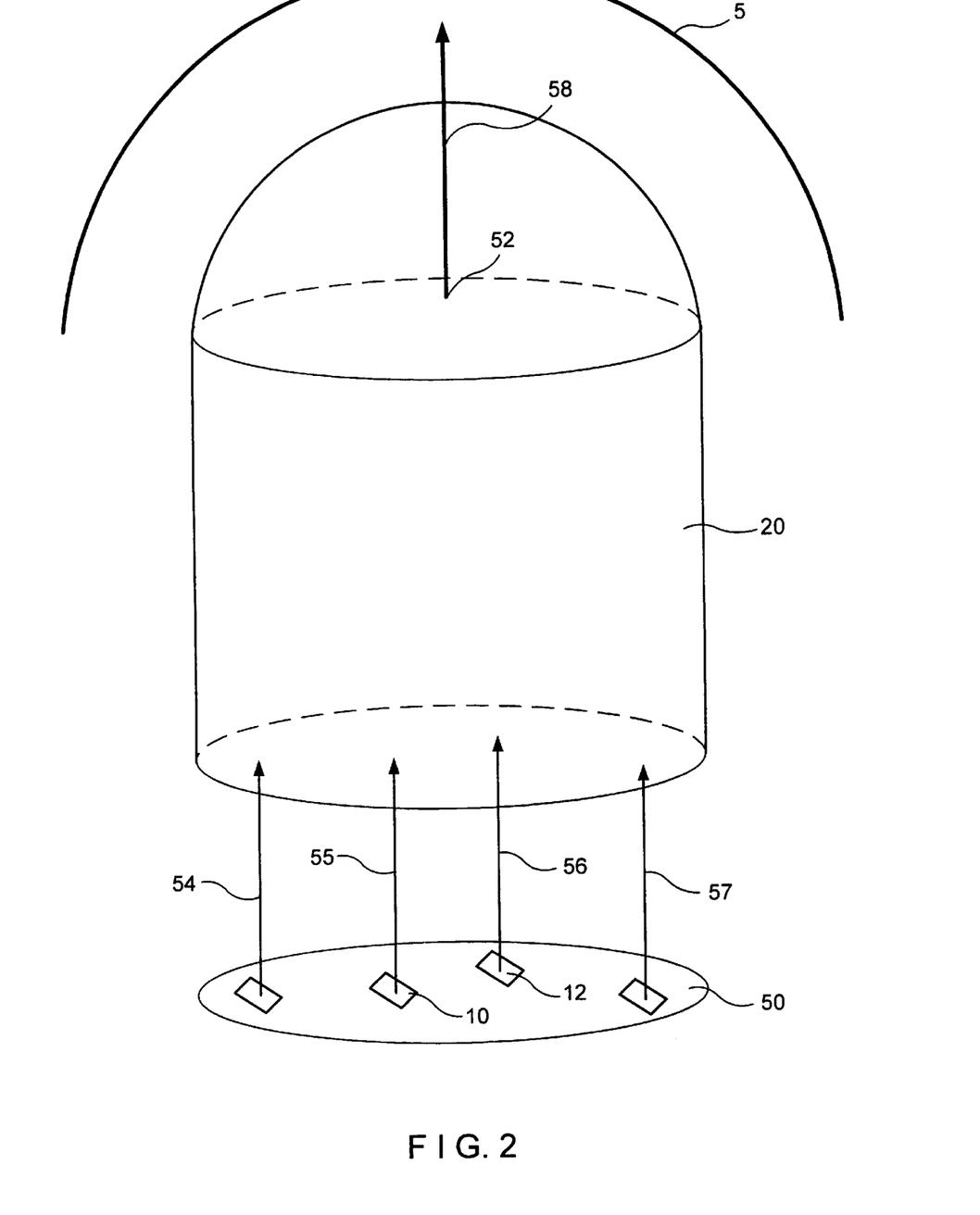
FIG. 2 is a schematic view of the optics according to FIG. 1 illustrating the imaging of light bundles which enter the optics at different locations.

Optics 20 which can be used according to the invention are shown in an even more simplified manner in FIG. 2. The essential features of the optics 20 are a greatly enlarged entrance pupil 50 and a virtually punctiform exit pupil 52. The smaller the exit pupil 52, the better the invention can be used for dome projection. The maximum tolerated size of the exit pupil 52 is substantially determined by the dome diameter and by the resolving capacity given by the human eye. In the case of dome diameters in the range of several meters, it is sufficient if the exit pupil has a diameter of less than a millimeter and, in particular, in the range of fractions of a millimeter.

The entrance pupil should receive a plurality of light bundles 54, 55, 56, 57 from a plurality of deflection devices and should combine these light bundles 54, 55, 56, 57 when entering perpendicular into the entrance pupil 50 into an individual light bundle 58 exiting in a parallel manner. The required size of the entrance pupil is substantially determined by the quantity of deflection devices and their dimensions. Since a plurality of deflection devices can be arranged with the use of micromechanics, the diameter of the entrance pupil can certainly be limited to several millimeters. With respect to the optics 20, this means a ratio of the diameter of the entrance pupil 50 to the diameter of the exit pupil 52 in the range of approximately 10 to 1. However, in the case of larger deflection devices which may be advisable in order to enable dissipation of thermal loading of the deflection devices due to very high laser output, even diameter ratios of the exit pupil 52 to the entrance pupil 50 of 100:1 or more may be required, which represents high requirements for optics calculation.

Figure 3:
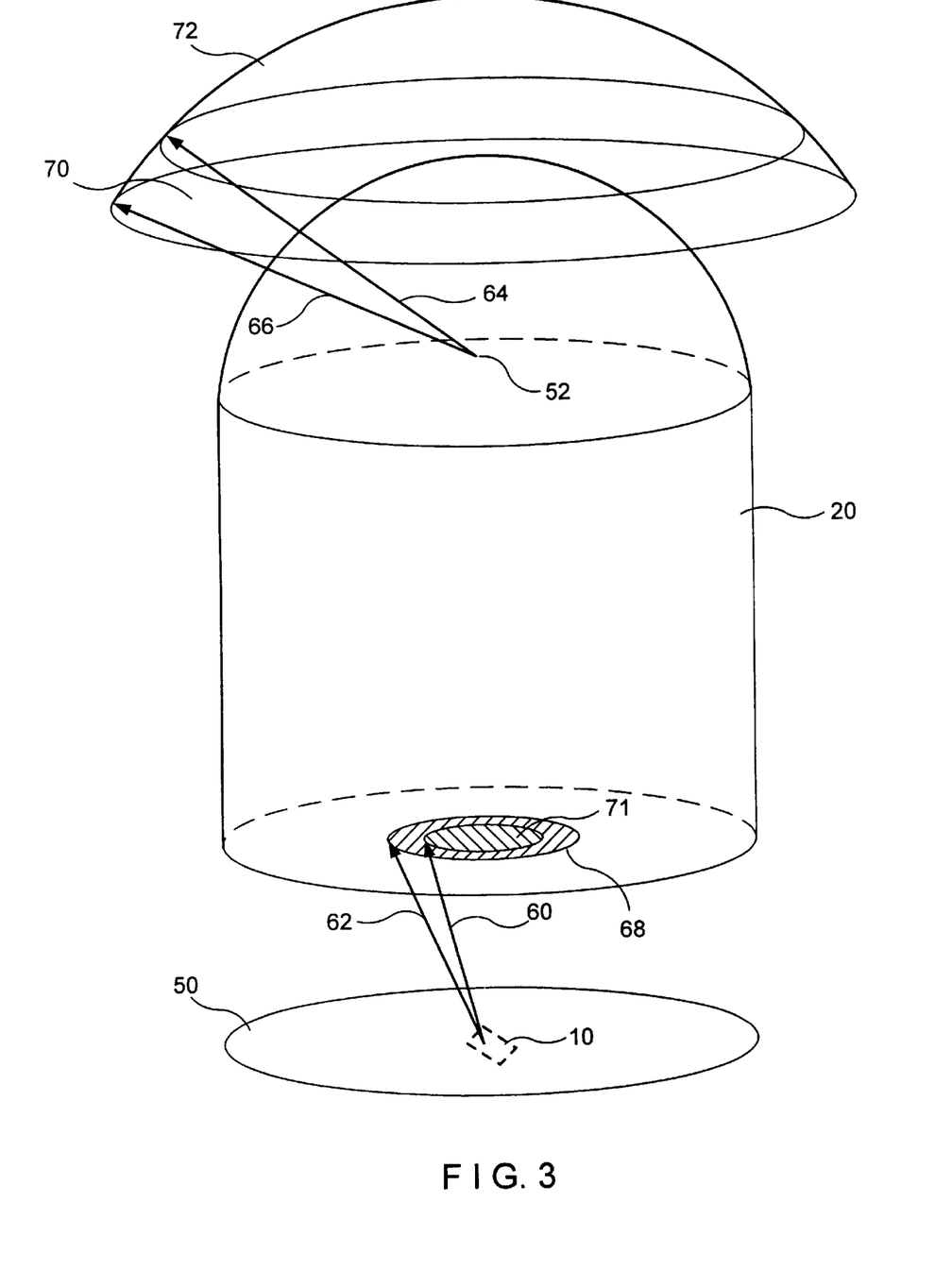
FIG. 3 is a schematic view of the optics according to FIG. 1 for describing the angular change of an incoming light bundle and, in particular, the imaging of a sphere sector by means of a circular ring which is raster scanned by means of an incoming light bundle.

FIG. 3 shows the imaging behavior of the optics 20 during an angular change of light bundles 60 and 62 which are shown by way of example. These light bundles 60 and 62 exit from the exit pupil 52 of the optics 20 as light bundles 64 and 66 at an increased angle, it is also shown by way of example in FIG. 3 that the emergent light bundles 64, 66 form a generated surface 70 of a spherical layer by means of deflection of the light bundle 60 and 62 for displaying a circular ring 68 in a plane between the entrance pupil and the optics 20. Further, a circle 71 which is imaged in the dome as a polar surface 72 by means of optics 20 is shown by way of example. The entire surface of the dome can be covered by means of partial surfaces of this kind which are generated by a plurality of deflection devices 10, 12. For this purpose, the partial surfaces are advisably dimensioned in such a way that surfaces of identical brightness are generated. The optics 20 are therefore extraordinarily well-suited for dome projection, wherein the center point of a spherical screen 5 used for projection advisably lies in the exit pupil 52.

If a circular surface is raster scanned instead of the circular ring 68, it is even possible, given a suitable lens system, to fill a half-sphere completely with image information.

The brightness impression is generally very slight in the case of conventional laser outputs because of the large surface to be illuminated. With a high-output laser, it can be expected that the loading of the deflection device will make necessary a plurality of deflection devices due to absorption in the deflection device, even if this absorption is minimal. Due to the characteristics of the optics 20 illustrated with reference to FIGS. 1 and 2, these deflection devices can be arranged next to one another. In order to completely illuminate a half-sphere, different circular rings 68 are preferably imaged by each of the deflection devices which are arranged next to one another. Given the same distance of the deflection devices from the optics 20, the individual spherical sectors are then combined to form a half-sphere when the outer diameter of one circular ring 68 is equal to the inner diameter of another circular ring 68 and the outer diameter of the largest circular ring 68 is imaged via the optics 20 in the equatorial plane of the screen 5 having the shape of a half-sphere.

In order to achieve a uniform luminous density on the spherical screen 5, that is, on the screen 5 made up of spherical surfaces, the individual partial surfaces 70 are advisably selected so as to have identical surfaces or areas because the lasers 2 and 4 which can be used by way of example for generating the input light bundles can be selected for the same light output and can also be driven in a homogeneous manner. In particular, a sphere can be illuminated homogeneously without overlapping areas by illuminating a spherical surface by spherical sectors 70.

Another especially advantageous criterion for dimensioning the division into partial surfaces consists in that the deflection frequency of every deflection device is selected in the same magnitude for the respective partial surface and each partial surface accordingly receives the same number of lines. This means that all of the deflection devices are constructed identically and are driven in such a way that identical movement sequences are ensured. The quantity of lines to be scanned in every rectangular partial image in the case of a flat screen and the length of the lines of a complete scanning of every partial image of a circular region in the case of a spherical screen area are of the same magnitude for every partial image. The adjustment of identical brightness is then carried out by means of modulating the intensity of the light bundles.

Figure 4:
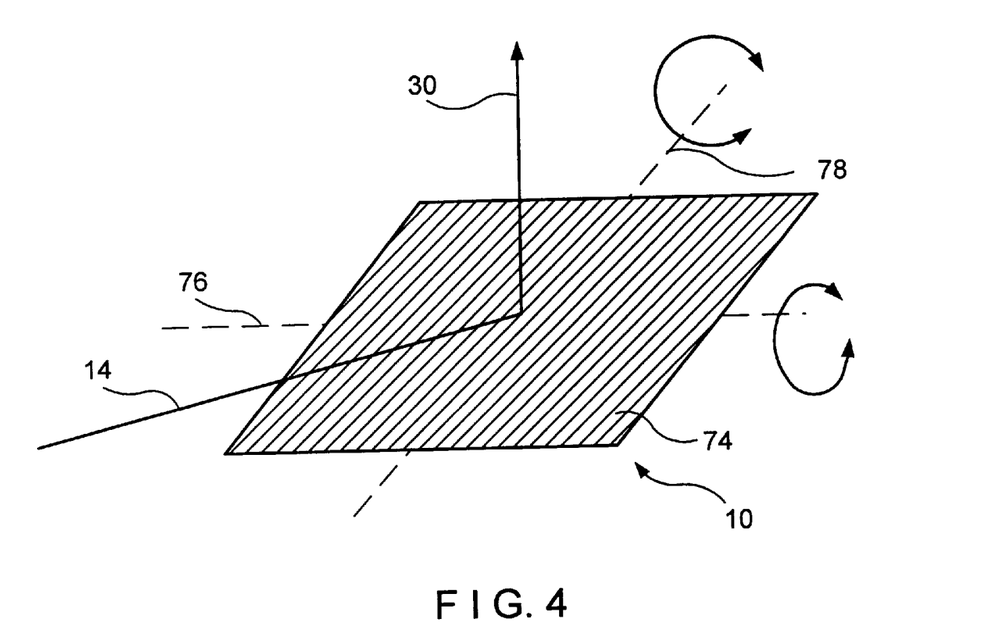
FIG. 4 shows an embodiment example for a deflection device.
Figure 5:
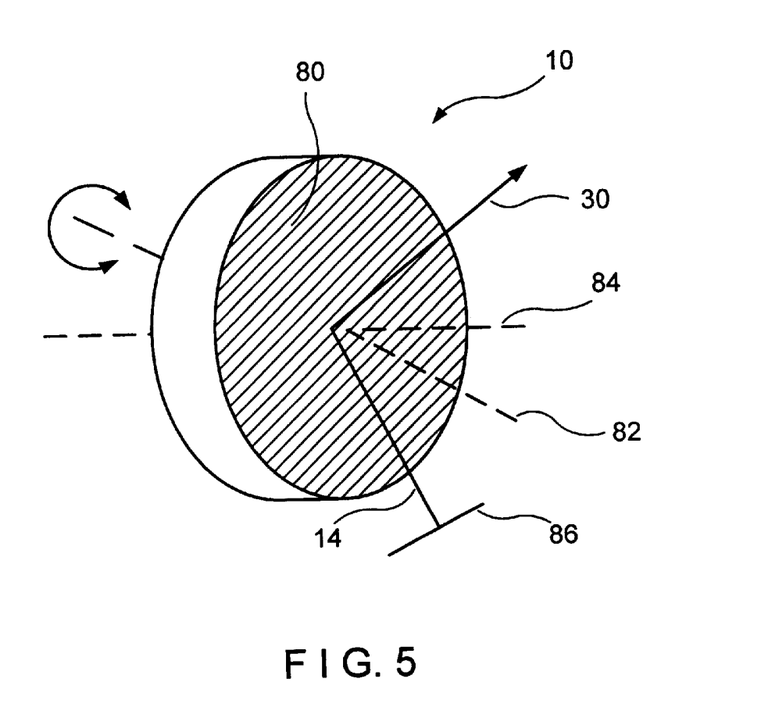
FIG. 5 shows an embodiment example for another deflection device which is particularly suitable for generating the circular rings described in FIG. 3.

Circular deflection can be realized in the manner shown by way of example with reference to FIGS. 4 and 5.

The deflection device 10 shown in FIG. 4 has a mirror 74 which is mounted so as to be rotatable about two axes 76 and 78. When the axes are controlled with a sinusoidal or cosine-shaped oscillation of equal amplitude, an incoming light bundle 14 is deflected, due to the reflection at the mirror 74, as an emergent light bundle 30 which describes a circle in a plane between the deflection device and the optics 20. The circular ring 68 can be illuminated in a simple manner by means of periodically changing the amplitude of the sine-shaped and cosine-shaped oscillation.

Since the deflection angle of the deflection device 10 need only be small because of the large deflection angle of the emergent light bundle which can be achieved with optics 20, the tilting of the mirror 74 can also be realized in a very simple manner. For example, instead of stationary axes 76 and 78, piezoelectric crystals can be arranged under all four corners of the mirror 74 which are driven in phase to generate the above-mentioned sine-shaped and cosine-shaped oscillation. The deflection device according to FIG. 4 can then be fabricated, for example, with the use of micromechanics, which allows a plurality of mirrors, together with driving electronics, to be integrated on a common substrate. This results in a compact constructional element for a plurality of deflection devices which is also accommodated in a small entrance pupil 50.

Due to the compactness in this construction form, possible interfering effects can also be eliminated through oscillation excitation of the surface of the mirror 74 in that the latter is dimensioned in such a way that its resonant frequency corresponds to the exciting frequency, for example, when the crystals controlling the tilting are used simultaneously as oscillators for generating the line frequency during raster scanning.

The embodiment example shown in FIG. 5 uses a rotating mirror 80. However, the axis of rotation 82 with respect to this rotating mirror 80 is tilted by an angle not equal to zero relative to its surface normal 84, so that an ellipse is described on a plane between the deflection device and the optics 20 by the emergent light bundle 30 due to the laws of reflection during the rotation of this mirror 80. The ellipse can be transformed into a circle by means of further optics, not shown, and/or by means of a corresponding curvature of the mirror 80. The desired circular ring 68 can then be illuminated, for example, by varying the angular deviation between the axis of rotation 82 and the surface normal 84.

Instead of a change in the angle between the axis of rotation 82 and the surface normal 84, an additional swiveling mirror 86 can also be provided which varies the angle of incidence of the incoming light bundle 14 or the emergent light bundle 30 over time. In this case, a circular ring 68 such as is shown in FIG. 3 is not formed because every circle is displaced slightly from concentricity relative to the previously scanned circle by means of tilting. However, this is irrelevant in view of the characteristics of the optics 20 shown in FIG. 2 because local displacements of the incoming light bundle in the entrance pupil have only a slight effect, if any, on the emergent light bundle.

This example shows that the uncritical positioning ensured by the optics 20 also makes it possible to use different deflection devices. If the invention is used, for instance, to display different partial images of a flat screen, a swiveling mirror and a polygon mirror can also be used for scanning in the manner customary in laser television. Due to the characteristics of the optics 20 which require small deflection angles in the entrance pupils, it is also possible to use acoustooptical modulators for deflection. The use of acoustooptical modulators was heretofore only possible to a limited degree in laser television technique because of the wavelength-dependent deflection causing chromatic aberrations. However, the laser beams of different wavelengths can be deflected independent from one another and subsequently combined by the optics 20, so that, as was described above, chromatic aberrations are also compensated in a simple manner by suitably selecting the position of the deflection devices 10 and 12 and the raster dimensions. In this case, the concept of partial images introduced above relates for every deflection device to the same image, but a division into partial images is effected with respect to the wavelength in this case. However, the invention is also not limited to this. It is equally possible for 3N partial images to be raster scanned for N spatially separated partial images for every 3 colors.

In contrast to the foregoing, more theoretical, embodiment examples, a practical case of application will be described more fully in the following. The following considerations were formulated for this case of application:

If a projection is to be carried out in a hemispherical surface with an individual deflection device, for example, as has already been described in the prior art, a fisheye lens would be required which transforms a scanning angle ±θ into a projection angle of ±90°.

Assuming a dome radius of r=8, then
it would be necessary to illuminate a surface of $f=2\pi r^2$ at 400 square meters, and
the entire wealth of data for generating an image filling the half-space would have to be transmitted by an individual deflection device 10.

The generation of a sufficiently high illumination on the projection surface presupposes correspondingly powerful light sources. When the illumination intensity on this hemispherical surface is compared with that in a cinema format with a diagonal of 12 m, the illumination intensity on the hemispherical surface, given the same luminous flux, is calculated to be smaller by a factor of 6.7 than the illumination intensity on the cinema screen.

This means that in order to achieve a brightness impression for dome projection which is comparable to that in a cinema, lasers with a useful light efficiency increased by a factor of 7 would be required without the use of optics 20. Further, at comparable resolution, the required amount of data would have to be transmitted at high raster scanning speeds approaching physical boundaries, which poses technical problems.

Both requirements can be met in accordance with the considerations mentioned above when seven scanning units, for example, are arranged as close together as possible inside an entrance pupil of an optical system, wherein every scanner covers an annular zone surface of ⅐ of the entire surface of the half-sphere. According to the previous numerical example, every deflection device thus illuminates approximately 60 square meters.

Figure 6:
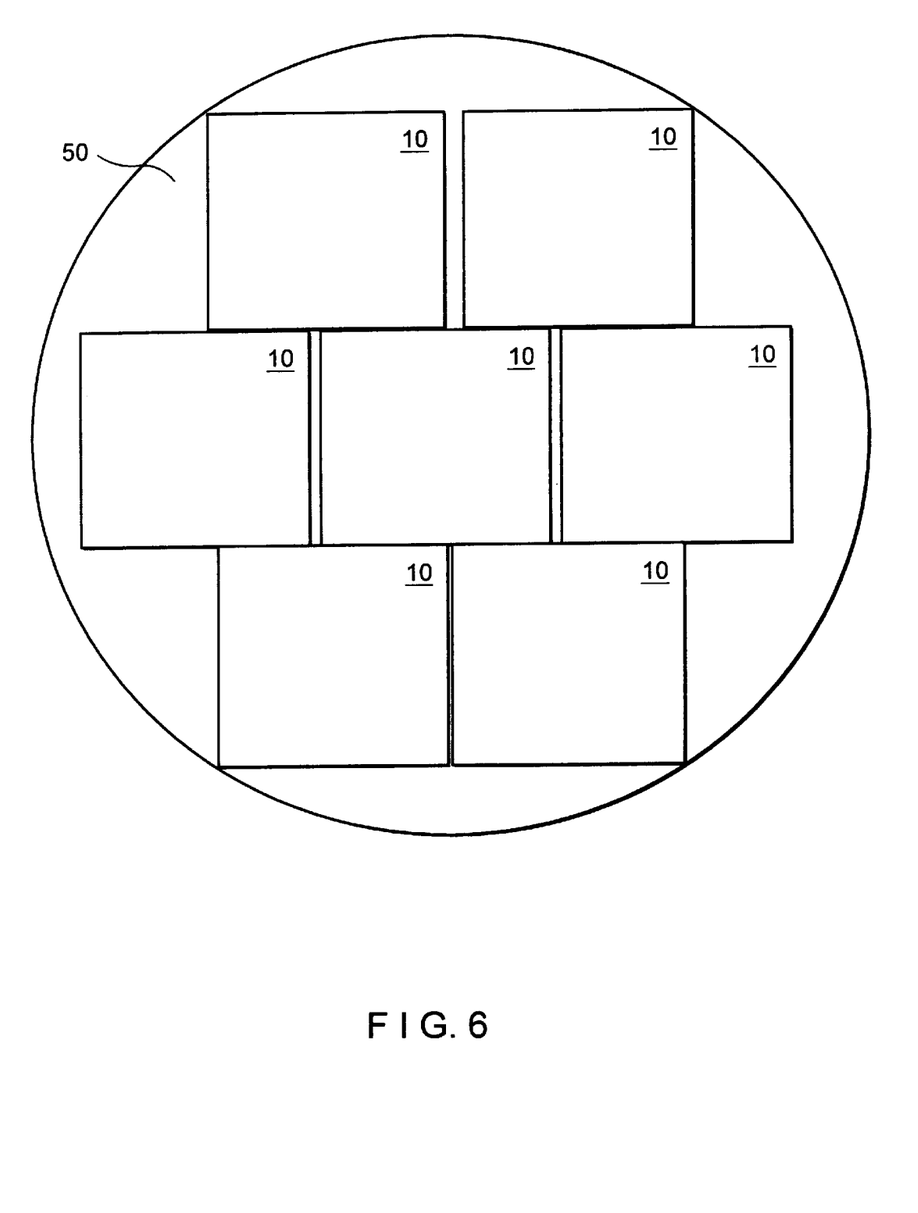
FIG. 6 shows an entrance pupil in which are arranged seven deflection devices.

FIG. 6 shows an arrangement of seven circularly scanning deflection devices 10 according to FIG. 4 having a size of 4 mm in an entrance pupil 50. The entrance pupil of optics 20 is dimensioned at 14.5 mm.

The optics 20 were designed in such a way with respect to image error correction that there exists proportionality between the incidence angle and exit angle; that is, a distortion correction was carried out according to the angle condition. Table 1 indicates the deflection range for the angle of incidence θ and the exit angle θ' of the optics 20 for each of the deflection devices 10 shown in the entrance pupil 50.

Each of the seven deflection mirrors has its own deflection associated with it. The mirror normal is inclined relative to the optical axis for each of the deflection devices 10, so that sufficient space is available so that a light bundle can impinge between the entrance pupil and lens vertex of the first lens on the mirror of the deflection devices 10 and is reflected in the direction of the optics. In order to provide sufficient space for the impingement of laser beams on the deflection device 10, the distance of the first lens vertex 101 from the entrance pupil was set at approximately 19 cm (according to the view in FIG. 7).

A magnification of the subsequent optics by approximately 8 was selected in the embodiment example in view of the following considerations: The greater the magnification, the smaller the diameters of the deflection areas of the individual deflection devices 10 imaged in the exit pupil by the optics 20. In this case, while the attainable brightness impressions in the annular zones remain unchanged regardless of the diameter of the exit pupil, the resulting image point diameters also change in direct proportion with the diameter of the exit pupil.

In the case of very small exit pupils located in the material of a lens, the thermal loading could destroy the lens. For this reason, the exit pupil in the embodiment example lies outside of the lens material between the lens vertices 116 and 117.

Figure 7:
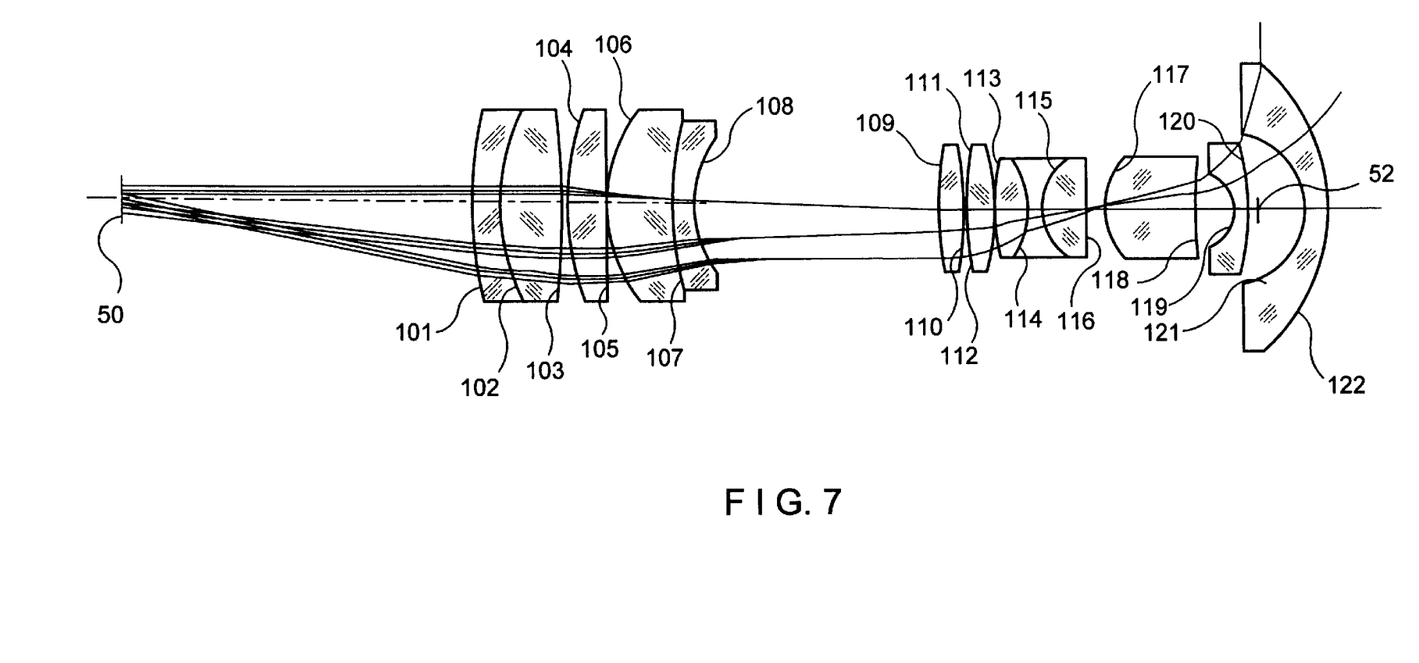
FIG. 7 shows optics with an entrance pupil according to FIG. 6 for dome projection.

The embodiment example for the optics 20 is shown schematically in FIG. 7. The curvature of the individual lens surfaces 101 to 122 is further indicated in Table II. Further, Table II shows the vertex spacing of the individual lens surfaces and the refractive index n and Abbe number v of the employed glass.

As can be seen from the beam shapes in FIG. 7, a first lens system which extends between the vertices 101 to 108 has an essentially focussing action for the central beam. The second lens system which extends between the lens vertices 109 to 122, focusses the different light bundles proceeding from this focus in practically one point, the exit pupil 52. The optical system is designed, as a whole, in such a way that there exists a proportionality between the angle of incidence and the exit angle.

While the foregoing description and drawings represent the present invention, it will be obvious to those skilled in the art that various changes may be made therein without departing from the true spirit and scope of the present invention.

TABLE I

| Deflection device | Incident angle θ in ° | Exit angle θ' in ° |
|---|---|---|
| 1 | 9.622–10.588 | 81.787–90 |
| 2 | 8.635–9.622 | 73.398–81.787 |
| 3 | 7.603–8.635 | 64.623–73.398 |
| 4 | 6.488–7.603 | 55.150–64.623 |
| 5 | 5.225–6.488 | 44.415–55.150 |
| 6 | 3.647–5.225 | 31.003–44.415 |
| 7 | 0–3.647 | 0–31.003 |

The deflection device 7 lies in the center of the entrance pupil. All angles refer to optical axis.

TABLE II

| Reference Number | Radius of curvature (mm) | Reference number between vertices | Distance between vertices (mm) | $n_c$ | $v_c$ |
|---|---|---|---|---|---|
| 101 | 338.7 | 101–102 | 14.0 | 1.7343 | 28.2 |
| 102 | 127.8 | 102–103 | 35.0 | 1.5544 | 63.2 |
| 103 | −266.5 | 103–104 | 1.8 | 1 | |
| 104 | 158.7 | 104–105 | 21.0 | 1.5544 | 63.2 |
| 105 | ∞ | 105–106 | 1.8 | 1 | |
| 106 | 90.3 | 106–107 | 35.0 | 1.6099 | 56.3 |
| 107 | 171.7 | 107–108 | 10.5 | 1.5848 | 40.5 |
| 108 | 57.0 | 108–109 | 130.4 | 1 | |
| 109 | 115.9 | 109–110 | 14.0 | 1.6539 | 55.6 |
| 110 | −210.1 | 110–111 | 1.8 | 1 | |
| 111 | 115.9 | 111–112 | 14.0 | 1.6539 | 55.6 |
| 112 | −210.1 | 112–113 | 1.8 | 1 | |
| 113 | 122.6 | 113–114 | 19.2 | 1.6099 | 56.3 |
| 114 | −43.8 | 114–115 | 7.0 | 1.7617 | 27.3 |
| 115 | 31.5 | 115–116 | 24.5 | 1.6539 | 55.6 |
| 116 | 334.9 | 116–117 | 10.1 | 1 | |
| 117 | 39.6 | 117–118 | 49.7 | 1.6942 | 30.9 |
| 118 | 258.2 | 118–119 | 21.1 | 1 | |
| 119 | −20.9 | 119–120 | 7.0 | 1.6539 | 55.6 |
| 120 | −130.3 | 120–121 | 30.3 | 1 | |
| 121 | −40.8 | 121–122 | 12.2 | 1.6099 | 56.3 |
| 122 | −96.1 | | | | |

The entrance pupil 50 is at a distance of 189 mm from the first lens vertex 101.

What is claimed is:

1. Apparatus for generating an image on a screen by illuminating image points in a plurality of partial images by means of light bundles, wherein the apparatus comprises:
   a plurality of deflection devices for deflecting a plurality of light bundles in respectively associated image points of individual partial images;
   control means for controlling the intensity of the light bundles depending on the brightness of the respective image point to be illuminated; and
   optics between the screen and said deflection devices for transforming the light bundles in a partial image associated with the respective light bundle;
   said optics including an entrance pupil which is spread out over an extended area and an exit pupil which is much smaller in comparison to the entrance pupil;
   said plurality of deflection devices being provided in or near the entrance pupil which is spread out over an extended area or are formed therein.

2. The apparatus according to claim 1, wherein the screen is a planar screen, wherein image can be scanned in two dimensions, and wherein each of the partial images contains a plurality of lines.

3. The apparatus according to claim 1, wherein one of the deflection devices is arranged centrally in the entrance pupil and generates a partial image whose center is located on the optical axis of the optics.

4. The apparatus according to claim 1, wherein the screen is spherically curved and the deflection devices are designed in connection with the optics for the illumination of partial spherical surfaces of the screen.

5. The apparatus according to claim 4, wherein a spherical center point is assigned to the spherically curved screen and the exit pupil of the optics is arranged in such a way that the spherical center point lies therein.

6. The apparatus according to claim 1, wherein a control device is provided for the deflection of a plurality of light bundles, wherein the control device deflects a plurality of the light bundles into the entrance pupil of the optics in a circular manner by means of deflection devices associated with these light bundles, wherein said control device for driving the deflection devices is designed in such a way that the outer radius of a circular ring illuminated by a deflection device is equal to the inner radius of a circular ring that is illuminated by another deflection device.

7. The apparatus according to claim 6, wherein the control device for the outer radius of the largest circular ring in the case of a circular deflection of the light bundle entering the optics is so designed that the light bundle exiting the optics lies on this radius within an equatorial plane of a sphere.

8. The apparatus according to claim 1, wherein image segments on the screen that are swept by the light bundle associated with a respective deflection device, and that are illuminated by partial images have equal surfaces.

9. The apparatus according to claim 1, wherein the image displayed by the deflection devices is resolved into lines and image points and each of the image segments illuminated by partial images has the same number of lines.

10. The apparatus according to claim 1, wherein at least one of the deflection devices contains a mirror.

11. The apparatus according to claim 10, wherein the mirror is arranged with a mirror surface which is rotatable about an inclined axis at an angle not equal to zero relative to its surface normal.

12. The apparatus according to claim 10, wherein a swiveling mirror is provided in said at least one of the deflection devices.

13. The apparatus according to claim 10, wherein a mirror which is swivelable in two directions is provided in said at least one of the deflection devices.

14. The apparatus according to claim 13, wherein the mirror which is swivelable in two directions has two axes orthogonal to one another for swiveling and a control device for these axes is provided in the apparatus, wherein a periodically sinusoidally varying angular change can be applied to both axes by means of said control device, and wherein the impressed angular change of one axis is shifted in phase by 90° relative to the other axis.

15. The apparatus according to claim 14, wherein oscillating behavior of the mirror about each of the axes has a frequency spectrum with a center frequency and a defined bandwidth and the frequency of the periodically sinusoidally changing angular change generated by the control device is equal to the center frequency or lies in its vicinity within the bandwidth.

16. The apparatus according to claim 14, wherein the two orthogonal axes lie orthogonal to the normal of the mirror surface in a neutral position of the mirror.

17. The apparatus according to claim 1, wherein light generation devices for light with at least three different wavelengths are provided for generating the light bundles.

18. The apparatus according to claim 1, wherein the foci of the optics lie in a spatial area outside of the optical elements forming the optics.

* * * * *

UNITED STATES PATENT AND TRADEMARK OFFICE
CERTIFICATE OF CORRECTION

PATENT NO.    : 6,169,621 B1                                       Page 1 of 1
DATED         : January 2, 2001
INVENTOR(S)   : Christhard Deter et al.

It is certified that error appears in the above-identified patent and that said Letters Patent is hereby corrected as shown below:

<u>Title page,</u>
Item [22], the PCT Filed, should read as follows:

-- [22]   Oct. 8, 1997 --

Signed and Sealed this

Twenty-first Day of October, 2003

JAMES E. ROGAN
*Director of the United States Patent and Trademark Office*